(12) United States Patent
McKay

(10) Patent No.: US 12,035,798 B2
(45) Date of Patent: Jul. 16, 2024

(54) IMPLEMENT HOLDER

(71) Applicant: Beren McKay, Lynnwood, WA (US)

(72) Inventor: Beren McKay, Lynnwood, WA (US)

( * ) Notice: Subject to any disclaimer, the term of this patent is extended or adjusted under 35 U.S.C. 154(b) by 303 days.

(21) Appl. No.: 17/549,572

(22) Filed: Dec. 13, 2021

(65) Prior Publication Data

US 2022/0191314 A1 Jun. 16, 2022

Related U.S. Application Data

(60) Provisional application No. 63/124,259, filed on Dec. 11, 2020.

(51) Int. Cl.
| | | |
|---|---|---|
| *A45F 5/00* | (2006.01) | |
| *F16M 13/00* | (2006.01) | |
| *H04M 1/04* | (2006.01) | |
| *A45F 5/10* | (2006.01) | |

(52) U.S. Cl.
CPC ............... *A45F 5/00* (2013.01); *F16M 13/00* (2013.01); *H04M 1/04* (2013.01); *A45F 2005/002* (2013.01); *A45F 2005/1066* (2013.01); *A45F 2005/1086* (2013.01)

(58) Field of Classification Search
CPC ........ A45F 2005/002; A45F 2005/1066; A45F 2005/1086; A45F 2200/0516; A45F 2200/0525; F16M 13/00; F16M 13/04; F16M 11/40; F16M 11/041; F16M 11/38; F16M 11/10; A46C 2011/003; A46C 2011/002; A46C 2011/001; A46C 2013/025; H04M 1/04; H04M 1/724092
See application file for complete search history.

(56) References Cited

U.S. PATENT DOCUMENTS

| | | | | |
|---|---|---|---|---|
| 8,579,172 | B2 * | 11/2013 | Monaco .................. | H04M 1/15 |
| | | | | 224/191 |
| 9,980,543 | B2 * | 5/2018 | Ma ........................ | G06K 7/0021 |
| 10,348,352 | B2 * | 7/2019 | Barnett .................. | F16M 13/00 |
| 10,469,640 | B2 * | 11/2019 | Gartz ..................... | F16M 11/14 |
| 10,721,343 | B2 * | 7/2020 | Nahum .............. | F16M 11/2014 |
| 10,750,844 | B2 * | 8/2020 | Peterson ................ | A45F 5/00 |
| 10,897,984 | B2 * | 1/2021 | Roth ...................... | A45F 5/00 |
| 10,918,181 | B2 * | 2/2021 | Adrain .................. | F41C 9/02 |
| 11,131,422 | B2 * | 9/2021 | Tsui ...................... | F16M 11/041 |
| 11,149,902 | B2 * | 10/2021 | Barnett ................ | F16M 13/005 |
| 11,320,089 | B2 * | 5/2022 | Fabec ..................... | F16B 1/00 |
| 11,530,779 | B2 * | 12/2022 | Epstein ................. | F16M 13/06 |

(Continued)

*Primary Examiner* — Eret C McNichols
(74) *Attorney, Agent, or Firm* — Forrest Law Office, P. C.

(57) ABSTRACT

An implement holder is disclosed. One embodiment provides an implement retention device including a main body having an attachment surface to secure the implement retention device to a mounting surface, a device retention surface having a retention slot that is wider than a device to be stored therein, the retention slot having a first side having an overhanging portion on at least a proximal end of the slot and a second side having an overhanging portion on at least a distal end of the retention slot, and a first magnet adjacent to the first side overhanging portion and a second magnet adjacent to the second overhanging portion, wherein when an implement is situated within the retention slot, the magnets rotate the implement and secures it behind the first overhanging portion and second overhanging portion. Other embodiments are disclosed herein.

7 Claims, 7 Drawing Sheets

(56) References Cited

U.S. PATENT DOCUMENTS

| | | | |
|---|---|---|---|
| 11,786,031 B1* | 10/2023 | Backus | H04M 1/0279 |
| | | | 224/577 |
| 11,841,110 B1* | 12/2023 | Lee | F16M 11/041 |
| 2012/0074006 A1* | 3/2012 | Monaco | H04M 1/15 |
| | | | 206/320 |
| 2016/0192752 A1* | 7/2016 | Lach | A45C 11/00 |
| | | | 206/45.2 |
| 2018/0184773 A1* | 7/2018 | Whitten | B60R 11/0241 |
| 2020/0127694 A1* | 4/2020 | Lim | H04B 1/3877 |
| 2021/0037127 A1* | 2/2021 | Lee | F16M 13/00 |
| 2021/0315366 A1* | 10/2021 | Licitra | A45C 11/00 |
| 2022/0117384 A1* | 4/2022 | Whitten | F16M 11/10 |
| 2023/0128108 A1* | 4/2023 | Wang | H04M 1/04 |
| | | | 294/142 |
| 2023/0225536 A1* | 7/2023 | Zhu | A47G 29/08 |
| | | | 206/6.1 |
| 2023/0389684 A1* | 12/2023 | Guan | A45F 5/10 |

* cited by examiner

IMPLEMENT HOLDER

BACKGROUND

Field of the Invention

The invention relates to an implement holder. More specifically the invention relates to a magnetically assisted implement holder.

Prior Art

Conventional implement holders include sheaths for knives and implements that can attach to belts and key chain attachments for smaller folding knives. These types of holders either have fixed attachment points such as belts or key-chains that retain the knife or implement in a pre-determined way.

SUMMARY

Accordingly, an improved method and apparatus for a magnetically assisted mechanical implement holder is described below in the Detailed Description. For example, one embodiment provides an implement retention device including a main body having an attachment surface to secure the implement retention device to a mounting surface, a device retention surface having a retention slot that is wider than a device to be stored therein, the retention slot having a first side having an overhanging portion on at least a proximal end of the slot and a second side having an overhanging portion on at least a distal end of the retention slot, and a first magnet adjacent to the first side overhanging portion and a second magnet adjacent to the second overhanging portion, wherein when an implement is situated within the retention slot, the magnets rotate the implement and secure it behind the first overhanging portion and second overhanging portion.

Another embodiment is described including a main body having an attachment surface to secure the device to a mounting surface, and a device retention surface having a retention slot to store an implement therein, the retention slot having a first sidewall and a second sidewall, with first sidewall being adjacent to a recessed back portion and the second sidewall being adjacent to a mounting surface having a magnet, wherein when an implement is placed within the retention slot, the first sidewall and second sidewall constrain the implement in at least one dimension and the magnet holds the implement within the slot, wherein to remove the implement from the retention slot, the implement is pressed near the first sidewall and the implement rotates into the recessed back portion as the opposing side of the implement is rotated away from the magnet and the second sidewall.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
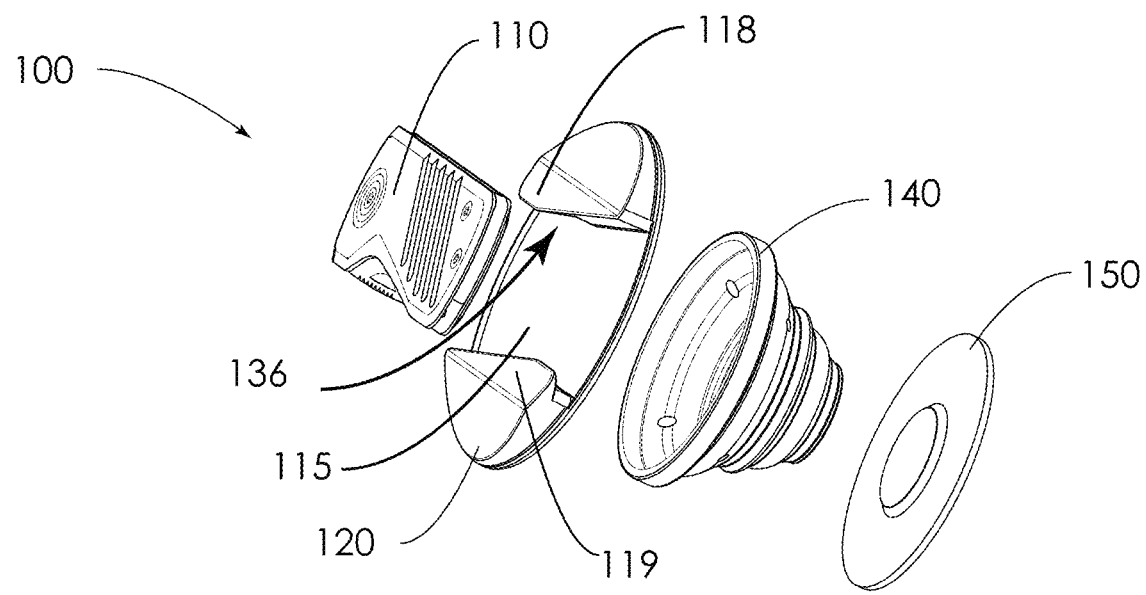
FIG. 1 is an exploded view of a first embodiment implement holder.

FIG. 1 shows an embodiment implement holder 100. In this embodiment, an implement 110 is inserted into a slot 115 in holder 120 having a surface 136 that has a magnet placed therein and extending at least partially along the edges of the slot 115 in a substantially non-opposing manner with the magnet 118 and 119 on the opposite surface and other end of the slot 115. The embodiment shown in FIG. 1 includes a main body 120 having an attachment surface 150 to secure the implement retention device to a mounting surface, and a device retention surface 122 having a retention slot 115 that is wider than a device 110 to be stored therein, the retention slot 115 having a first side having an overhanging portion 134 on at least a proximal end of the slot 115 and a second side having an overhanging portion on at least a distal end of the retention slot. The present embodiment includes a collapsible support 140 between main body 120 and attachment surface 150, however other embodiments may omit the collapsible section 140 and/or base 150.

Each surface 136 of implement 110 as shown in FIG. 1 further has a retaining lip 134 or overhang extending out over surface 136 near the magnet. In this way, an implement 110 with metal can be inserted into the slot 115 and then will rotate toward the magnet 118 on either end of the slot 115 and then be mechanically secured by the retaining lip 134 or overhang, as shown in FIG. 3, FIG. 4, FIG. 6 and FIG. 8.

In one embodiment, a holder 100 has a slot 115 having a first side and a second side, with the first side having a reflex angle between a first surface 132 and second surface 136. The second side also has a reflex angle between a first surface 132 and second surface 136 and the slot 115 is arranged with the first surface 132 of the first side opposing the second surface 136 of the second side, and the first surface 132 of the second side is opposing the second surface 136 of the first side. The present embodiment utilizes a reflex angle on each surface, but other embodiments are not so limited.

Figure 2:
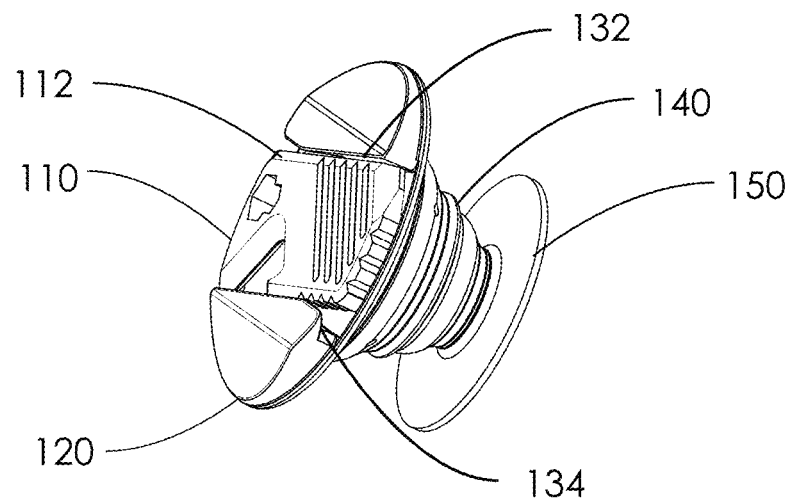
FIG. 2 is a right perspective view of a second embodiment implement holder.
Figure 3:
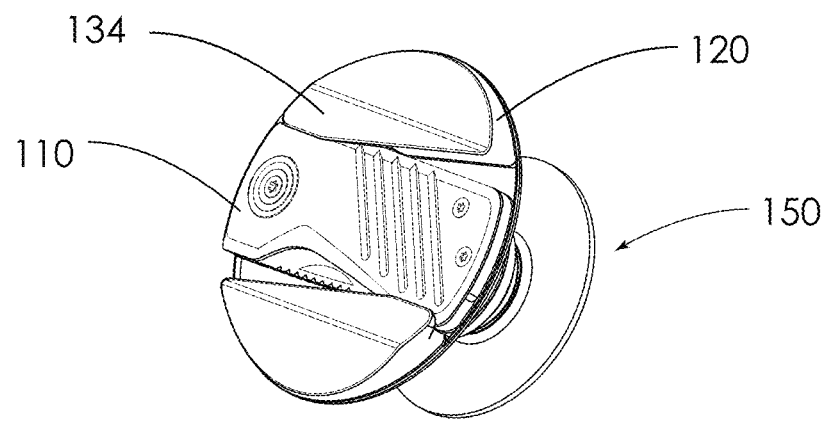
FIG. 3 is a right perspective view of the embodiment shown in FIG. 1.
Figure 4:
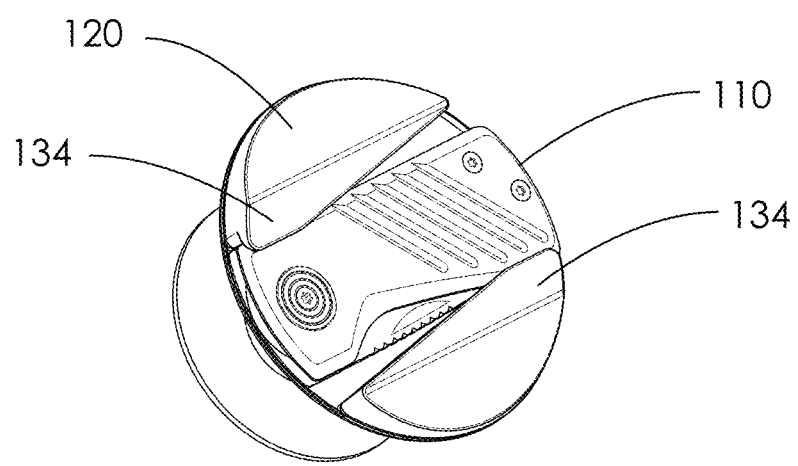
FIG. 4 is a left perspective view of the embodiment shown in FIG. 1.

For example, an implement 110 may have angled edge surfaces that allow it to rotate within a slot 115 with a single surface on each wall, or other arrangements where an implement is allowed to rotate within a slot 115 that is wider than the implement but has sides with angles other than reflex angles. In this way, when an implement such as a knife, tool, flashlight, etc., is placed within the slot 115 in FIG. 2, the implement can rotate within the slot as shown in FIG. 3, and can be mechanically secured by side retaining surfaces of the slot 115, such as by retaining lip 134.

Figure 8:
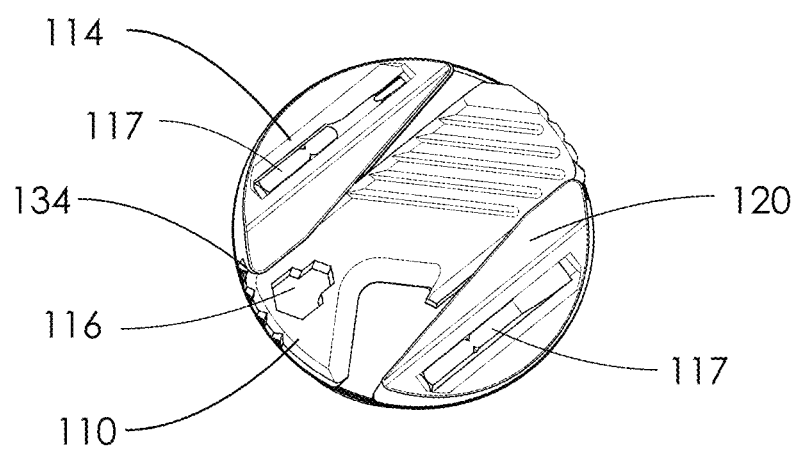
FIG. 8 is a left perspective view of the embodiment implement holder in FIG. 2.

The slot 115 also has an open front to insert an implement 110 and a back surface 122 enclosing the back of the slot 115 within the holder 100. Additionally, placed adjacent to the second surfaces are one or more magnets situated along the second surface 136. In the present embodiment, each second surface 136 has a magnet 118 and/or 119, but in other embodiments each surface may have multiple magnets, only one surface may have a magnet, or a single magnet can be shared between the two second surfaces, etc. Along the second surfaces 136 having the magnet(s) is a lip 134 or overhanging portion on the outward edge of the slot 115, opposing the back wall 122. FIG. 8 illustrates a section view as shown by the line A in FIG. 6 and shows the magnet 118 placement in the embodiment holder 120 housing the implement 110 secured underneath overhanging lip 134.

In the present embodiment, the lip 134 or overhanging portion extends along the second surface 136 having the magnet 118 while first surface 132 has no lip or overhanging portion. Other embodiments are not so limited, for example, the lip 134 or overhanging portion can extend for just a portion of the second surface 136, or can extend over a portion of the second surface 136 and a smaller portion of the first surface 132, along the edge of the whole slot 115, etc. Additionally, in some embodiments the implement may have a chamfered or shaped edge 112 to fit under the lip 134 or overhanging portion to improve alignment or stability.

Figure 9:
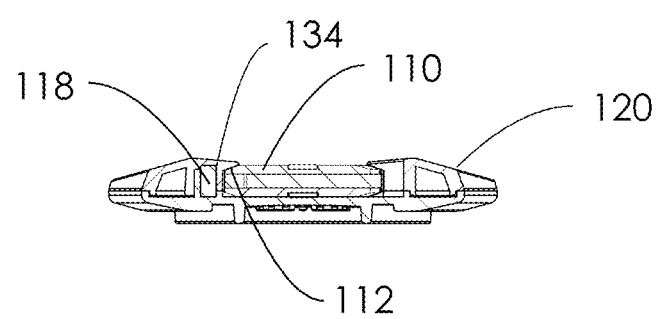
FIG. 9 is a section view along line A in FIG. 6.
Figure 10:
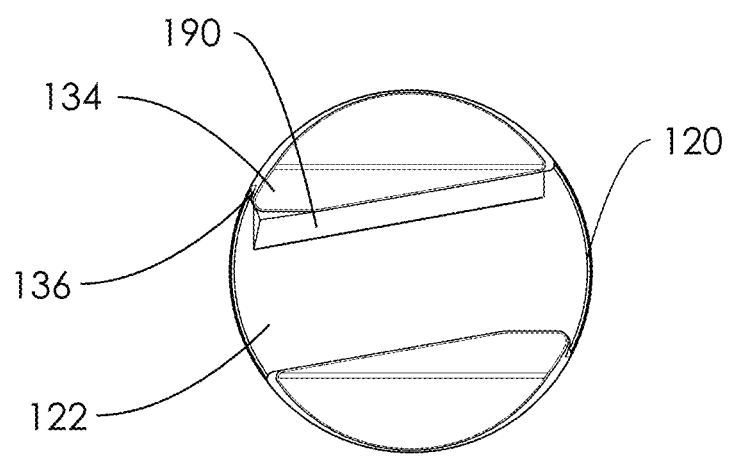
FIG. 10 is a plan view of an embodiment implement holder with a recessed portion within a flat retention surface.

As shown in FIG. 9, in the present embodiment chamfered edge 112 is substantially coplanar with the bottom surface of overhanging lip 134. In this way, as the implement 110 is rotated into position toward the magnet 118, the face of chamfered edge 112 rests adjacent and coplanar to the underside of overhanging lip 134 to provide a secure placement that also acts to wedge the implement 110 against surface 122 of implement holder 120. In some embodiments, implement 110 may have a chamfered edge on both a front and back surface to allow insertion into slot 115 in a plurality of ways while in some embodiments the chamfered edge 112 may only be on a front or back surface of an implement 110 to allow insertion in one orientation.

In the present arrangement, the lip 134 or overhanging portion extends along the second surface 136 but not along the first surface 132 so as not to obstruct the implement 110 being placed within the slot 115, but once the implement is placed within the slot, the implement 110 rotates toward the magnet(s) 118 placed on or near the second surfaces 136, and the implement is then tucked underneath the lip 134 or overhanging portion and is mechanically held secure in the holder 120. In this way, the magnet 118 and the lip 134 or overhanging portion work in combination to hold the implement 110 in place within slot 115.

Figure 5:
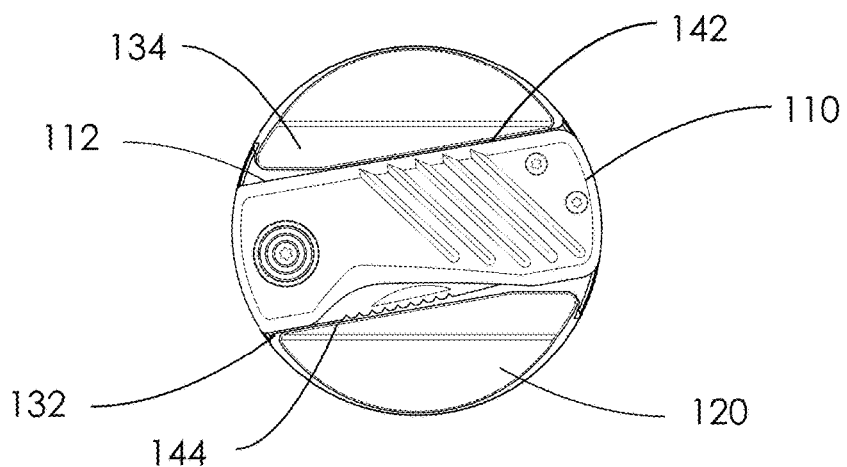
FIG. 5 is a plan view of the embodiment in FIG. 2 showing an implement in an unlocked orientation.
Figure 6:
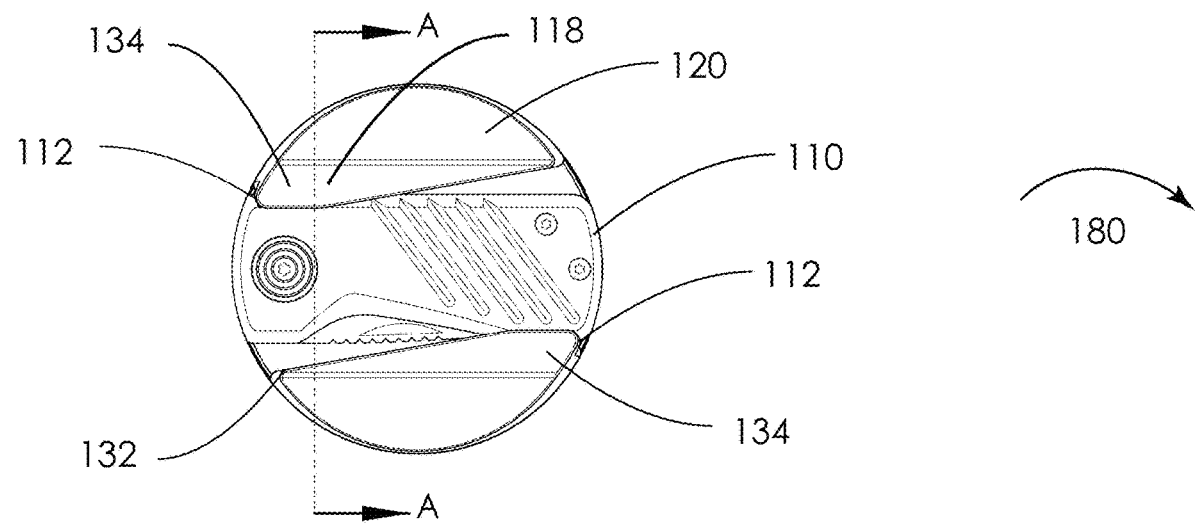
FIG. 6 is a plan view of the embodiment in FIG. 1 showing the implement in a locked orientation.
Figure 7:
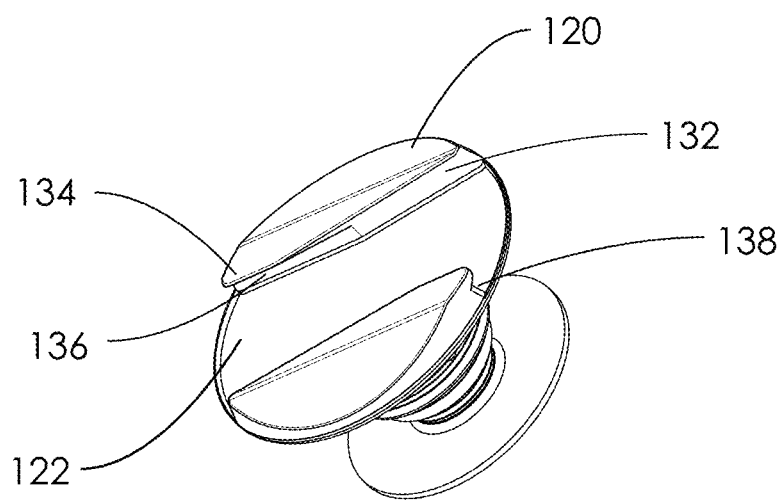
FIG. 7 is a right perspective view of the implement holder in FIG. 1.

With reference to FIG. 5, an implement 110 is placed within the slot 115 in holder 120 and fits within the unbounded surfaces 132 of each opposing end of the slot. As the implement enters the slot, the magnets placed adjacent the lips 134 on opposing ends of the slot attract the implement 110 which then rotates underneath the lips 134 as shown by rotation arrow 180. Other embodiments may be arranged to rotate in an opposite direction.

Lips 134 on either side of the slot 115 have a defining edge 142 on one side of the slot 115 and defining edge 144 on the other side slot 115. In the present embodiment, edge 144 is substantially within the plane of face 132 and edge 142 is substantially within the plane of the opposing face 132 and edges 144 and 142 define an oblique edge of each overhanging lip 134 so as to diagonally extend from being substantially coplanar to face 132 to continue to form a leading edge of lip 134 which overhangs face 136 as face 136 is at a reflex angle to face 132.

Additionally, defining edges 142 and 144 may align with opposing sides of implement 110 to provide alignment for implement 110 as it is placed in slot 115. In the present embodiment, edges 142 and 144 are in a substantially parallel arrangement as are the edges of implement 110. In other embodiments, edges of implement 110 may have a non-parallel arrangement, at least in part, and edges 142 and 144 can correspond to the non-parallel sides of the implement to still provide alignment for the implement to be inserted into slot 115.

With reference back to FIG. 1, the implement holder 120 has a first magnet 118 adjacent to the first side overhanging portion 134 and a second magnet 119 adjacent to the second overhanging portion, wherein when an implement 110 is situated within the retention slot 115, the magnets rotate the implement 110 and secure it behind the first overhanging portion 134 and second overhanging portion 134.

In some embodiments, the implement holder 120 may have additional bit recesses 114 to hold bits or tools that may fit within the implement or may be otherwise used. By way of example and with reference to FIG. 8, implement 110 has an opening defining a bit driver 116 and implement holder 120 has a first and second bit 117 stored within the holder 120 in bit recess(es) 114 but that may be removed from the holder 120 and inserted within bit driver 116 in implement 110 and used accordingly. In some embodiments, magnet 118 may also hold bit 117 within bit recess 114 of holder 120. Other embodiments may use alternate securing mechanisms such as additional magnets, separate magnets from magnet 118, spring loaded retention devices, press fit semi-flexible walls, etc.

In some embodiments, a slot 115 may have a different magnet arrangement, side surface shapes or lip or overhanging placement to allow an implement to rotate about a relatively non-central point of the implement 110. In one example embodiment, a slot 115 may have one overhanging portion 134 or lip and one magnet placed adjacent the surface 136 underneath the lip, wherein when the implement is placed within the slot 115 it rotates more so about the end of the implement 110 and is there stored by the magnet holding it adjacent the surface 136 under the lip 134 or overhanging portion.

In another embodiment, an implement retention device may include a main body 120 having an attachment surface to secure the device to a mounting surface, and a device retention surface 122 having a retention slot to store an implement therein, the retention slot having a first sidewall and a second sidewall, with first sidewall being adjacent to a recessed back portion 136 and the second sidewall being adjacent to a mounting surface having a magnet, wherein when an implement is placed within the retention slot, the first sidewall and second sidewall constrain the implement in at least one dimension and the magnet holds the implement within the slot, wherein to remove the implement from the retention slot, the implement is pressed near the first sidewall and the implement rotates into a recessed back portion 190 as the opposing side of the implement is rotated away from the magnet and the second sidewall.

For example, a backwall surface 122 may have a concave portion 190 and a flat surface portion 122 with a magnet behind it. Further, in this arrangement, the concave portion is configured to receive the implement when the implement is pressed on above the concave portion, thus rotating the implement away from the flat surface and directly away from the magnet.

In some embodiments, a method for inserting an implement 110, such as a knife, light or tool, into a holder 120 includes placing the implement into a slot having a partial recessed edge, then using one or more magnets to rotate the implement within the slot so at least a portion of the implement is underneath the partial recessed edge, thus holding the implement in place. The holder may have an outer lip and when the implement is placed within the slot in the holder, the outer lip may help to secure the implement within the slot. In this way, aiding the holder to hold the implement as the implement is rotating into a secure position by the magnets and underneath the partial recessed edge. In this way, an implement is placed within the slot and then rotates into alignment under the partial recessed edge and within the outer lip, thus securing the implement in the holder.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An implement retention device, comprising:
a main body having an attachment surface to secure the implement retention device to a mounting surface;
a device retention surface having a retention slot that is wider than a device to be stored therein, the retention slot having a first side having an overhanging portion on at least a proximal end of the slot and a second side having an overhanging portion on at least a distal end of the retention slot;
a first magnet adjacent to the first side overhanging portion and a second magnet adjacent to the second overhanging portion, wherein when an implement is situated within the retention slot, the magnets rotate the implement and secures it behind the first overhanging portion and second overhanging portion.

2. The implement retention device of claim 1, further comprising a knife with a thickness that is less than a gap under the first and second overhanging portions, wherein the knife rotates into a secured position under the overhanging portions by magnetic force and is mechanically held in at least one-direction by the overhanging portion.

3. The knife of claim 2, further comprising a first and second chamfered edge, wherein each chamfered edge mates underneath the first and second overhanging portions.

4. The implement retention device of claim 1, wherein the first overhanging portion has a first ramped surface between the overhanging portion and the main body of the implement retention device and the second overhanging portion has a second ramped surface between the overhanging portion and the main body of the implement retention device, wherein the first and second ramped surfaces are configured to receive implements having different thicknesses.

5. The implement retention device of claim 4, wherein the first and second ramped surfaces are indexed with a plurality of stepped surfaces to receive a plurality of specifically sized implements.

6. The implement retention device of claim 1, wherein the retention slot has a base surface having an annular ring to encourage a substantially central alignment of the implement when it is placed and rotated within the retention slot.

7. An implement retention device, comprising:
a main body having an attachment surface to secure the device to a mounting surface; and
a device retention surface having a retention slot to store an implement therein, the retention slot having a first sidewall and a second sidewall, with first sidewall being adjacent to a recessed back portion and the second sidewall being adjacent to a mounting surface having a magnet, wherein when an implement is placed within the retention slot, the first sidewall and second sidewall constrain the implement in at least one dimension and the magnet holds the implement within the slot, wherein to remove the implement from the retention slot, the implement is pressed near the first sidewall and the implement rotates into the recessed back portion as the opposing side of the implement is rotated away from the magnet and the second sidewall.

\* \* \* \* \*